US011098178B2

(12) United States Patent
Yao et al.

(10) Patent No.: US 11,098,178 B2
(45) Date of Patent: Aug. 24, 2021

(54) RESIN COMPOSITION AND RESIN MOLDED BODY

(71) Applicant: FUJIFILM Business Innovation Corp., Tokyo (JP)

(72) Inventors: Kenji Yao, Kanagawa (JP); Ryo Tanaka, Kanagawa (JP); Kana Miyazaki, Kanagawa (JP); Masahiro Moriyama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/120,317

(22) Filed: Sep. 3, 2018

(65) Prior Publication Data

US 2019/0276638 A1 Sep. 12, 2019

(30) Foreign Application Priority Data

Mar. 6, 2018 (JP) .............................. JP2018-039558

(51) Int. Cl.
  *C08L 1/10* (2006.01)
  *B29C 45/00* (2006.01)
  *B29K 1/00* (2006.01)

(52) U.S. Cl.
  CPC ............ *C08L 1/10* (2013.01); *B29C 45/0001* (2013.01); *B29K 2001/08* (2013.01); *C08L 2205/025* (2013.01); *C08L 2205/035* (2013.01); *C08L 2207/53* (2013.01)

(58) Field of Classification Search
  CPC ....................................................... C08L 1/10
  See application file for complete search history.

(56) References Cited

U.S. PATENT DOCUMENTS

| | | | | |
|---|---|---|---|---|
| 3,668,157 A * | 6/1972 | Combs | ................... | C08L 67/025 524/37 |
| RE29,915 E * | 2/1979 | Kroekel | ................... | C08L 67/06 523/509 |
| 5,292,783 A * | 3/1994 | Buchanan | ............... | C08L 67/02 524/37 |
| 2010/0151156 A1* | 6/2010 | Kawabe | .............. | B29C 48/9155 428/1.31 |
| 2015/0368442 A1* | 12/2015 | Soyama | .................. | C08L 67/04 524/41 |
| 2016/0090473 A1* | 3/2016 | Yao | .......................... | C08L 1/10 524/40 |
| 2016/0251452 A1* | 9/2016 | Toyama | .................. | C08L 67/02 536/64 |
| 2017/0174870 A1* | 6/2017 | Yao | ........................ | C08K 5/0016 |
| 2017/0174871 A1* | 6/2017 | Yao | ........................ | C08K 5/0016 |
| 2017/0260294 A1* | 9/2017 | Toyama | ..................... | C08L 1/14 |
| 2018/0230295 A1* | 8/2018 | Yao | ............................ | C08L 1/12 |
| 2019/0010251 A1* | 1/2019 | Tanaka | ....................... | C08L 1/14 |
| 2019/0092929 A1* | 3/2019 | Tanaka | ....................... | C08L 1/14 |
| 2019/0276637 A1* | 9/2019 | Yao | ............................ | C08L 1/10 |
| 2019/0276639 A1* | 9/2019 | Yao | ............................ | C08L 1/10 |
| 2019/0276640 A1* | 9/2019 | Tanaka | .................... | C08L 67/04 |
| 2019/0276641 A1* | 9/2019 | Yao | .......................... | C08L 33/10 |
| 2019/0276642 A1* | 9/2019 | Miyazaki | .................. | C08L 1/14 |
| 2019/0276643 A1* | 9/2019 | Miyazaki | ............ | B29C 45/1706 |
| 2019/0276644 A1* | 9/2019 | Yao | ............................ | C08L 1/14 |
| 2019/0276645 A1* | 9/2019 | Yao | .......................... | C08J 9/107 |

FOREIGN PATENT DOCUMENTS

| | | | |
|---|---|---|---|
| JP | 2015044975 A | * | 3/2015 |
| JP | 2016069423 | | 5/2016 |
| WO | 2016067662 | | 5/2016 |

OTHER PUBLICATIONS

Machine Translation of JP-2015044975-A, 2019 (Year: 2019).*

* cited by examiner

*Primary Examiner* — Liam J Heincer
(74) *Attorney, Agent, or Firm* — JCIPRNET

(57) ABSTRACT

A resin composition containing a cellulose acylate (A) having, in a side chain, a group having a hydrocarbon chain with 5 or more carbon atoms; a polyester resin (B); and an ester compound (C) having a molecular weight of about 250 or more and about 2000 or less. The mass ratio ((B)/(A)) of the polyester resin (B) to the cellulose acylate (A) is about 0.05 or more and about 0.5 or less. The mass ratio ((C)/(A)) of the ester compound (C) to the cellulose acylate (A) is about 0.02 or more and about 0.15 or less.

9 Claims, No Drawings

RESIN COMPOSITION AND RESIN MOLDED BODY

CROSS-REFERENCE TO RELATED APPLICATIONS

This application is based on and claims priority under 35 USC 119 from Japanese Patent Application No. 2018-039558 filed Mar. 6, 2018.

BACKGROUND

(i) Technical Field

The present invention relates to a resin composition and a resin molded body.

(ii) Related Art

In the related art, various resin compositions are provided and used in a wide range of applications. In particular, resin compositions are used for, for example, various parts and housings of home appliances and automobiles. Thermoplastic resins are used for parts, such as housings, of office machines and electrical and electronic devices.

In recent years, plant-derived resins have been used, and one of plant-derived resins known in the art is cellulose acylate.

A resin molded body formed of a resin composition containing cellulose acylate having, in a side chain, a group that has a hydrocarbon chain with 5 or more carbon atoms and with which at least one hydroxyl group of cellulose has been substituted (e.g., cellulose acylate formed by acylating cellulose with an acyl group having a hydrocarbon chain with 5 or more carbon atoms) has high elastic modulus and high water resistance. However, the resin molded body containing the cellulose acylate has been found to have low impact resistance, particularly, low Charpy impact strength measured in a weld line (hereinafter referred to as "weld-line impact strength").

SUMMARY

A resin composition containing:

a cellulose acylate (A) having, in a side chain, a group having a hydrocarbon chain with 5 or more carbon atoms;

a polyester resin (B); and an ester compound (C) having a molecular weight of about 250 or more and about 2000 or less, wherein the mass ratio ((B)/(A)) of the polyester resin (B) to the cellulose acylate (A) is about 0.05 or more and about 0.5 or less, and the mass ratio ((C)/(A)) of the ester compound (C) to the cellulose acylate (A) is about 0.02 or more and about 0.15 or less.

DETAILED DESCRIPTION

Exemplary embodiments of the resin composition and the resin molded body (in this specification, the common features in a first exemplary embodiment and a second exemplary embodiment is referred to as "exemplary embodiments") will be described below.

In this specification, the amount of each component in an object refers to, when there are several substances corresponding to each component in the object, the total proportion or total amount of the substances present in the object, unless otherwise specified.

The expression "polymer of A" encompasses a homopolymer of only A and a copolymer of A and a monomer other than A. Similarly, the expression "copolymer of A and B" encompasses a copolymer of only A and B (hereinafter referred to as a "homocopolymer" for convenience) and a copolymer of A, B, and a monomer other than A and B.

A cellulose acylate (A), a polyester resin (B), an ester compound (C), a polymer (D), and a poly(meth)acrylate compound (E) are also referred to as a component (A), a component (B), a component (C), a component (D), and a component (E), respectively.

Resin Composition

A resin composition according to an exemplary embodiment contains a cellulose acylate (A) having, in a side chain, a group having a hydrocarbon chain with 5 or more carbon atoms; a polyester resin (B); and an ester compound (C) having a molecular weight of about 250 or more and about 2000 or less.

In a resin composition according to a first exemplary embodiment, the mass ratio (B/A) of the polyester resin (B) to the cellulose acylate (A) is about 0.05 or more and about 0.5 or less, and the mass ratio (C/A) of the ester compound (C) to the cellulose acylate (A) is about 0.02 or more and about 0.15 or less.

For a resin composition according to a second exemplary embodiment, the weld-line impact strength is about 10 $kJ/m^2$ or more, and the value obtained by dividing the weld-line impact strength by the Charpy impact strength is about 0.5 or more.

Since cellulose acylate when heated has low fluidity due to its strong intramolecular and intermolecular hydrogen bonds, a resin composition containing cellulose acylate has low moldability when used to form a molded body. The addition of a plasticizer to cellulose acylate in order to improve the moldability of the resin composition containing cellulose acylate degrades elastic modulus and water resistance. The use of cellulose acylate having, in a side chain, a group that has a hydrocarbon chain with 5 or more carbon atoms and with which at least one hydroxyl group of cellulose has been substituted (e.g., cellulose acylate formed by acylating cellulose with an acyl group having a hydrocarbon chain with 5 or more carbon atoms) improves moldability. The obtained resin molded body has high elastic modulus and high water resistance. However, a resin molded body containing the cellulose acylate has been found to have low impact resistance, particularly, low weld-line impact strength.

The resin composition according to the exemplary embodiments provides a resin molded body having high weld-line impact strength. The reason for this is not clear but assumed as described below.

In the resin composition according to the exemplary embodiments, the cellulose acylate (A) (component (A)) having, in a side chain, a group having a hydrocarbon chain with 5 or more carbon atoms has higher hydrophobicity than cellulose acylates, such as cellulose acetate. Because of this property, the ester compound (C) (component (C)) having a molecular weight of about 250 or more and about 2000 or less may be compatible with the component (A) to achieve molecular dispersion. When the resin composition contains the polyester resin (B) (component (B)) in addition to the component (A) and the component (C), the hydrophobicity of the phase that contains the component (C) and in which the component (A) is molecularly dispersed becomes close to that of the phase of the component (B), thereby improving the dispersibility and interface strength of each component. As a result, the component (B) may contribute to appropriate increases in melt viscosity and elastic modulus to improve the impact resistance of the phase of the component (A) containing the component (C). This may provide a resin molded body having high weld-line impact strength.

In the first exemplary embodiment, it is found that it may be difficult to exert the foregoing effect by only mixing the component (A), the component (B), and the component (C). Thus, the weld-line impact strength of the resin molded body is improved by controlling the mass ratio of the component (B) to the component (A) and the mass ratio of the component (C) to the component (A) in the foregoing ranges. This may be because the foregoing effect is exerted when the balance of the roles played by the components is achieved by controlling the mass ratio of each of the components (B) and (C) to the particular cellulose acylate in the foregoing range.

In the second exemplary embodiment, the component (A), the component (B), and the component (C) are present, and the weld-line impact strength is about 10 kJ/m$^2$ or more. The value (weld-line impact strength/Charpy impact strength) obtained by dividing the weld-line impact strength by the Charpy impact strength is about 0.5 or more.

For example, when the value of weld-line impact strength/Charpy impact strength is too small, the weld-line strength is too low in a position where a weld line is present compared with that in a position where no weld line is present. This results in a large difference in impact strength between the position where a weld line is present and the position where no weld line is present. To improve weld-line strength, a difference in Charpy impact strength between the position where a weld line is present and the position where no weld line is present may be small. When the weld-line impact strength itself is too low even with a small difference in Charpy impact strength between the position where a weld line is present and the position where no weld line is present, the strength at the weld line is low.

In the second exemplary embodiment, the weld-line impact strength is about 10 kJ/m$^2$ or more, and the ratio of weld-line impact strength/Charpy impact strength is about 0.5 or more. The resin molded body thus has a high weld-line impact strength, and a difference in impact strength between a position where a weld line is present and a position where no weld line is present is small in the resin molded body, which leads to high weld-line impact strength. This may be because the dispersibility and interface strength of each component is improved by making the hydrophobicity of the phase of the component (B) close to that of the phase that contains the component (C) and in which the component (A) is molecularly dispersed, as described above.

As described above, the resin molded body according to the exemplary embodiment may be a resin molded body having high weld-line impact strength.

The resin molded body according to the exemplary embodiment may also have high plane impact strength (plane impact resistance) because of the foregoing effect.

The components of the resin composition according to the exemplary embodiments will be described below in detail.

Cellulose Acylate (A): Component (A)

Cellulose acylate (A) is a resin having, in a side chain, a group having a hydrocarbon chain with 5 or more carbon atoms. Cellulose acylate (A) is any compound having, in a side chain, a group having a hydrocarbon chain with 5 or more carbon atoms and may be, for example, a cellulose derivative in which at least one hydroxyl group of cellulose is acylated with a compound having a hydrocarbon chain with 5 or more carbon atoms and a carboxy group. Cellulose acylate (A) may be a cellulose derivative in which at least one hydroxyl group of cellulose is acylated with a compound having a hydrocarbon chain with 5 or more carbon atoms and a group selected from the group consisting of a carboxy group, a carboxylic anhydride group, and a carboxylic acid halide group (particularly, carboxylic acid chloride group). Moreover, at least one hydroxyl group in a cellulose derivative having an acyl group may be substituted with a compound having a hydrocarbon chain with 5 or more carbon atoms and a group selected from the group consisting of an epoxy group, an isocyanate group, and a halogen group.

The number of carbon atoms (including the carbon of a carboxy group when the carboxy group is contained) in the hydrocarbon chain with 5 or more carbon atoms is preferably 7 or more, more preferably 8 or more, and still more preferably 12 or more in order to obtain a resin molded body having high weld-line impact strength. To efficiently introduce a group having a hydrocarbon chain with 5 or more carbon atoms to a side chain, the number of carbon atoms in the hydrocarbon chain is preferably 24 or less, more preferably 22 or less, and still more preferably 20 or less.

The compound having a hydrocarbon chain with 5 or more carbon atoms (including the carbon of a carboxy group when the carboxy group is contained) may be a compound having a carboxy group. The compound having a hydrocarbon chain with 5 or more carbon atoms and a carboxy group may have only a saturated carbon chain or may have an unsaturated carbon chain. Specific examples of the compound include fatty acids, such as valeric acid, caproic acid, enanthic acid, caprylic acid, pelargonic acid, capric acid, lauric acid, myristic acid, pentadecylic acid, palmitic acid, palmitoleic acid, margaric acid, stearic acid, oleic acid, vaccenic acid, linoleic acid, linolenic acid, eleostearic acid, tuberculostearic acid, arachidic acid, arachidonic acid, eicosenoic acid, behenic acid, erucic acid, lignoceric acid, nervonic acid, hexadecadienoic acid, hexadecatrienoic acid, octadecatetraenoic acid, octadecapentaenoic acid, icosatetraenoic acid, icosapentaenoic acid, docosapentaenoic acid, and docosahexaenoic acid. Among these, fatty acids may be naturally occurring compounds. One of naturally occurring compounds may be stearic acid in order to obtain a resin molded body having high weld-line impact strength.

The cellulose acylate (A) according to the exemplary embodiments is obtained by acylating (substituting) a hydroxyl group of cellulose with a compound having a hydrocarbon chain with 5 or more carbon atoms and a carboxy group. Specifically, for example, a cellulose acylate (A) having a stearoyl group in a side chain is obtained by acylating at least one hydroxyl group of cellulose with stearic acid.

The compound having a hydrocarbon chain with 5 or more carbon atoms may be a compound in which an alcoholic hydroxyl group or phenolic hydroxyl group is linked to a hydrocarbon chain with 5 or more carbon atoms. In particular, the compound having a hydrocarbon chain with 5 or more carbon atoms may be a naturally occurring compound. The naturally occurring compound may be a cardanol compound in order to obtain a resin molded body having high weld-line impact strength.

A cardanol compound is a component obtained from cashew and is a general name of compositions containing a compound in which a phenolic hydroxyl group is linked to a hydrocarbon chain with 15 carbon atoms. Examples of the cardanol compound include simple substances of components having a hydrocarbon chain containing an unsaturated bond, simple substances of components having a hydrocarbon chain containing only saturated bonds, and a mixture of these simple substances. Examples of the cardanol compound include simple substances obtained by isolating only components containing an unsaturated bond or only components containing only unsaturated bonds from components obtained from cashew; a mixture in which the proportions of components obtained from cashew are controlled; and simple substances or a mixture of compounds produced by hydrogenating an unsaturated bond of a component containing a hydrocarbon chain having the unsaturated bond.

The compound in which an alcoholic hydroxyl group or phenolic hydroxyl group is linked to a hydrocarbon chain with 5 or more carbon atoms may be a hydrogenated alicyclic compound (a compound produced by hydrogenating the aromatic ring at the phenol moiety of the cardanol compound into a cyclohexane ring) of the cardanol compound. In the exemplary embodiments, the cardanol compound and the hydrogenated alicyclic compound of the cardanol compound are collectively referred to as cardanol compound-derived compounds.

When the compound in which a group having an alcoholic hydroxyl group or phenolic hydroxyl group is linked to a hydrocarbon chain with 5 or more carbon atoms is a cardanol compound-derived compound, a hydroxyl group of cellulose may be acylated (substituted) by introducing a carboxy group by causing a reaction between a hydroxyl group of the cardanol compound-derived compound and a compound having a functional group selected from the group consisting of a carboxyl group, a carboxylic anhydride group, and a carboxylic acid halide group (particularly, carboxylic acid chloride group) in order to obtain a resin molded body having high weld-line impact strength.

Thus, the cellulose acylate (A) according to the exemplary embodiments is prepared, for example, such that a hydroxyl group of cellulose is acylated (substituted) with a compound in which a carboxy group is introduced to a hydroxyl group of the compound in which an alcoholic hydroxyl group or phenolic hydroxyl group is linked to a hydrocarbon chain with 5 or more carbon atoms. Specifically, for example, the cellulose acylate (A) having a cardanol-derived group in a side chain is prepared by acylating at least one hydroxyl group of cellulose with a cardanol compound-derived compound. In other words, in the exemplary embodiments, a cardanol-derived group in a side chain of the cellulose acylate (A) refers to a group to be introduced by using the cardanol compound-derived compound. When a hydroxyl group of cellulose is acylated with, for example, an acyl group with 1 or more and 4 or less carbon atoms, the cellulose acylate (A) having a cardanol-derived group in a side chain may be prepared with a group obtained by a reaction between a hydroxyl group of a cardanol compound-derived compound and a compound having a functional group selected from the group consisting of an isocyanate group and a halogen group.

The following compounds are included as examples of the compound having a functional group selected from the group consisting of a carboxyl group, a carboxylic anhydride group, and a carboxylic acid halide group (particularly, carboxylic acid chloride group), the compound being caused to react with a hydroxyl group of the cardanol compound-derived compound. Examples include compounds having dicarboxylic acid, carboxylic anhydride, dicarboxylic acid halide, or monochlorocarboxylic acid. Specific examples include dicarboxylic acids, such as malonic acid, succinic acid, glutaric acid, pimelic acid, suberic acid, azelaic acid, sebacic acid, dodecanedicarboxylic acid, pentadecanedicarboxylic acid, hexadecanedicarboxylic acid; carboxylic anhydrides of these dicarboxylic acids and the like; dicarboxylic acid halides, such as acid halides of these dicarboxylic acids; monochlorocarboxylic acids, such as monochloroacetic acid, 3-chloropropionic acid, 3-fluoropropionic acid, 4-chiorobutyric acid, 4-fluorobutyric acid, 5-chlorovaleric acid, 5-fluorovaleric acid, 6-chlorohexanoic acid, 6-fluorohexanoic acid, 8-chlorooctanoic acid, 8-fluorooctanoic acid, 12-chlorododecanoic acid, 12-fluorododecanoic acid, 18-chiorostearic acid, and 18-fluorostearic acid.

As described above, the cellulose acylate (A) having, in a side chain, a group having a hydrocarbon chain with 5 or more carbon atoms may be a cellulose acylate (A) in which a hydroxyl group of cellulose is acylated (substituted) with a compound having a hydrocarbon chain with 5 or, more carbon atoms. The cellulose acylate (A) may be, for example, a cellulose derivative represented by general formula (CE).

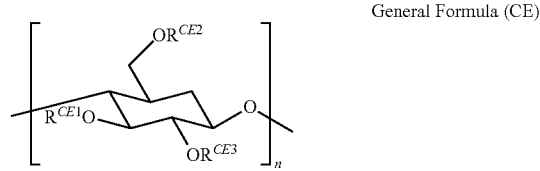

General Formula (CE)

In general formula (CE), $R^{CE1}$, $R^{CE2}$, and $R^{CE3}$ each independently represent a hydrogen atom or an acyl group, and n represents an integer of 2 or more. It is noted that at least one of n $R^{CE1}$'s, n $R^{CE2}$'s, and n $R^{CE3}$'s represents an acyl group, and at least one of the acyl groups represented by $R^{CE1}$, $R^{CE2}$, and $R^{CE3}$ represents an acyl group having a hydrocarbon chain with 5 or more carbon atoms.

In general formula (CE), n is preferably, but not necessarily, 200 or more and 3000 or less, and more preferably 500 or more and 1000 or less.

The expression "in general formula (CE), $R^{CE1}$, $R^{CE2}$, and $R^{CE3}$ each independently represent an acyl group" means that at least one hydroxyl group in the cellulose derivative represented by general formula (CE) is acylated.

Specifically, n $R^{CE1}$'S in the molecule of the cellulose derivative represented by general formula (CE) may be all the same, partially the same, or different from each other. The same applies to n $R^{CE2}$'s and n $R^{CE3}$'s At least one of the acyl groups represented by $R^{CE1}$, $R^{CE2}$ and $R^{CE3}$ represents an acyl group having a hydrocarbon chain with 5 or more carbon atoms. As long as at least one of the acyl groups represented by $R^{CE1}$, $R^{CE2}$, and $R^{CE3}$ is an acyl group having a hydrocarbon chain with 5 or more carbon atoms, other acyl groups may be acyl groups having a hydrocarbon chain with 1 or more and 4 or less carbon atoms. Alternatively, all of the acyl groups represented by $R^{CE1}$, $R^{CE2}$, and $R^{CE3}$ may be acyl groups having a hydrocarbon chain with 5 or more carbon atoms.

Example of acyl groups other than the acyl groups having a hydrocarbon chain with 5 or more carbon atoms include a cetyl group, a propionyl group, and a butyryl group (butanoyl group).

Examples of the acyl group having a hydrocarbon chain with 5 or more carbon atoms include acyl groups derived from fatty acids of the compound having a hydrocarbon chain with 5 or more carbon atoms. Specific examples include a propenoyl group, a hexanoyl group, a heptanoyl group, an octanoyl group, a nonanoyl group, a decanoyl group, an undecanoyl group, a dodecanoyl group, a myristoyl group, a palmitoyl group, a stearoyl group, an isostearoyl group, a nonadecanoyl group, and an icosanoyl group.

In particular, a stearoyl group is preferred among these in order to obtain a resin molded body having high weld-line impact strength.

The acyl group having a hydrocarbon chain with 5 or more carbon atoms may be an acyl group derived from a compound formed by introducing a carboxy group to a hydroxyl group of the compound in which an alcoholic hydroxyl group or phenolic hydroxyl group is linked to a hydrocarbon chain with 5 or more carbon atoms. In particular, a cardanol-derived group is preferred in order to obtain a resin molded body having high weld-line impact strength.

Thus, the group having a hydrocarbon chain with 5 or more carbon atoms is preferably at least one of a cardanol-derived group and a stearoyl group.

For cellulose acylate having, in a side chain, a group having a hydrocarbon chain with 5 or more carbon atoms, the average amount of the group having a hydrocarbon chain with 5 or more carbon atoms (the degree of hydroxylation) per glucose unit is from about 0.15 groups to about 2.5 groups on a number basis (preferably from about 0.2 groups to about 2 groups, more preferably from about 0.5 groups to about 1.5 groups on a number basis) in order to obtain a resin molded body having high weld-line impact strength.

The average amount of the group having a hydrocarbon chain with 5 or more carbon atoms on a number basis per glucose unit is determined by using the following method. The average amount is determined from the integration ratio between the peak from hydrogen of cellulose and the peak from the group having a hydrocarbon chain with 5 or more carbon atoms using $H^1$-NMR (JMN-ECA available from JEOL RESONANCE). When an acyl group having a hydrocarbon chain with 1 or more and 4 or less carbon atoms is present, the average amount is determined from the integration ratio among the peak from hydrogen of cellulose, the peak from the group having a hydrocarbon chain with 5 or more carbon atoms, and the peak from the acyl group having a hydrocarbon chain with 1 or more and 4 or less carbon atoms.

Since the resin composition according to the exemplary embodiment has the particular cellulose acylate, the obtained resin molded body also has good dimensional stability.

Polyester Resin (B): Component (B)

Examples of the polyester resin (B) include polymers of hydroxyalkanoates (hydroxyalkanoic acids), polycondensates of polycarboxylic acids and polyhydric alcohols, and ring-opened polycondensates of cyclic lactams.

The polyester resin (B) may be an aliphatic polyester resin. Examples of the aliphatic polyester include polyhydroxyalkanoates (polymers of hydroxyalkanoates) and polycondensates of aliphatic diols and aliphatic carboxylic acids.

Among these aliphatic polyesters, a polyhydroxyalkanoate is preferred as the polyester resin (B) to obtain a resin molded body having high weld-line impact strength.

Examples of the polyhydroxyalkanoate include a compound having a structural unit represented by general formula (PHA).

The compound having a structural unit represented by general formula (PHA) may include a carboxyl group at each terminal of the polymer chain (each terminal of the main chain) or may include a carboxyl group at one terminal and a different group (e.g., hydroxyl group) at the other terminal.

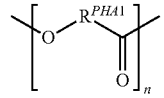

General Formula (PHA)

In general formula (PHA), $R^{PHA1}$ represents an alkylene group having 1 or more and 10 or less carbon atoms, and n represents an integer of 2 or more.

In general formula (PHA), the alkylene group represented by $R^{PHA1}$ may be an alkylene group having 3 or more and 6 or less carbon atoms. The alkylene group represented by $R^{PHA1}$ may be a linear alkylene group or a branched alkylene group and is preferably a branched alkylene group.

The expression "$R^{PHA1}$ in general formula (PHA) represents an alkylene group" indicates 1) having a [O—$R^{PHA1}$—C(=O)—] structure where $R^{PHA1}$ represents the same alkylene group, or 2) having plural [O—$R^{PHA1}$—C(=O)—] structures where $R^{PHA1}$ represents different alkylene groups ($R^{PHA1}$ represents alkylene groups different from each other in branching or in the number of carbon atoms (e.g., a [O—$R^{PHA1A}$—(=O)—][O—$R^{PHA1B}$—C(=O)—] structure).

In other words, the polyhydroxyalkanoate may be a homopolymer of one hydroxyalkanoate (hydroxyalkanoic acid) or may be a copolymer of two or more hydroxyalkanoates (hydroxyalkanoic acids).

In general formula (PHA), the upper limit of n is not limited, and n is, for example, 20,000 or less. For the range of n, n is preferably 500 or more and 10,000 or less, and more preferably 1,000 or more and 8,000 or less.

Examples of the polyhydroxyalkanoate include homopolymers of hydroxyalkanoic acids (e.g., lactic acid, 2-hydroxybutyric acid, 3-hydroxybutyric acid, 4-hydroxybutyric acid, 2-hydroxy-3-methylbutyric acid, 2-hydroxy-3,3-dimethylbutyric acid, 3-hydroxyvaleric acid, 4-hydroxyvaleric acid, 5-hydroxyvaleric acid, 3-hydroxyhexanoic acid, 2-hydroxyhexanoic acid, 2-hydroxyisohexanoic acid, 6-hydroxyhexanoic acid, 3-hydroxypropionic acid, 3-hydroxy-2,2-dimethylpropionic acid, 3-hydroxyhexanoic acid, and 2-hydroxy-n-octanoic acid), and copolymers of two or more of these hydroxyalkanoic acids.

Among these, the polyhydroxyalkanoate is preferably a homopolymer of a branched hydroxyalkanoic acid having 2 or more and 4 or less carbon atoms, or a homocopolymer of a branched hydroxyalkanoic acid having 2 or more and 4 or less carbon atoms and a branched hydroxyalkanoic acid having 5 or more and 7 or less carbon atoms, more preferably a homopolymer of a branched hydroxyalkanoic acid having 3 carbon atoms (i.e., polylactic acid), or a homocopolymer of 3-hydroxybutyric acid and 3-hydroxyhexanoic acid (i.e., polyhydroxybutyrate-hexanoate), and still more preferably a homopolymer of a branched hydroxyalkanoic acid having 3 carbon atoms (i.e., polylactic acid) in order to suppress a decrease in the transparency of the obtained resin molded body and improve impact resistance.

The number of carbon atoms in hydroxyalkanoic acid is a number inclusive of the number of the carbon of the carboxyl group.

Polylactic acid is a polymer compound formed by polymerization of lactic acid through ester bonding.

Examples of polylactic acid include a homopolymer of L-lactic acid, a homopolymer of D-lactic acid, a block copolymer including a polymer of at least one of L-lactic acid and D-lactic acid, and a graft copolymer including a polymer of at least one of L-lactic acid and D-lactic acid.

Examples of a "compound copolymerizable with L-lactic acid or D-lactic acid" include glycolic acid, dimethyl glycolic acid, 3-hydroxybutyric acid, 4-hydroxybutyric acid, 2-hydroxypropanoic acid, 3-hydroxypropanoic acid, 2-hydroxyvaleric acid, 3-hydroxyvaleric acid, and 4-hydroxyvaleric acid; polycarboxylic acids, such as oxalic acid, malonic acid, succinic acid, glutaric acid, adipic acid, pimelic acid, azelaic acid, sebacic acid, undecanedioic acid, dodecanedioic acid, and terephthalic acid, and anhydrides thereof; polyhydric alcohols, such as ethyleneglycol, diethyleneglycol, triethyleneglycol, 1,2-propanediol, 1,3-propanediol, 1,3-butanediol, 1,4-butanediol, 2,3-butanediol, 1,5-pentanediol, 1,6-hexanediol, 1,9-nonanediol, 3-methyl-1,5-pentanediol, neopentylglycol, tetramethyleneglycol, and 1,4-hexanedimethanol; polysaccharides, such as cellulose; aminocarboxylic acids, such as α-amino acid; hydroxycarboxylic acids, such as 5-hydroxyvaleric acid, 2-hydroxycaproic acid, 3-hydroxycaproic acid, 4-hydroxycaproic acid, 5-hydroxycaproic acid, 6-hydroxycaproic acid, 6-hydroxymethylcaproic acid, and mandelic acid; and cyclic esters, such as glycolide, β-methyl-δ-valerolactone, γ-valerolactone, and ε-caprolactone.

Polylactic acid is known to be produced by: a lactide method via lactide; a direct polymerization method involving heating lactic acid in a solvent under a reduced pressure to polymerize lactic acid while removing water; or other methods.

In polyhydroxybutyrate-hexanoate, the copolymerization ratio of 3-hydroxyhexanoic acid (3-hydroxyhexanoate) to a copolymer of 3-hydroxybutyric acid (3-hydroxybutyrate) and 3-hydroxyhexanoic acid (3-hydroxyhexanoate) is preferably 3 mol % or more and 20 mol % or less, more preferably 4 mol % or more and 15 mol % or less, and still more preferably 5 mol % or more and 12 mol % or less to obtain a resin molded body having high weld-line impact strength.

The copolymerization ratio of 3-hydroxyhexanoic acid (3-hydroxyhexanoate) is determined using $H^1$-NMR such that the ratio of the hexanoate is calculated from the integrated values of the peaks from the hexanoate terminal and the butyrate terminal.

The weight-average molecular weight (Mw) of the polyester resin (B) may be 10,000 or more and 1,000,000 or less (preferably 50,000 or more and 800,000 or less, more preferably 100,000 or more and 600,000 or less) to obtain a resin molded body having high weld-line impact strength.

The weight-average molecular weight (Mw) of the polyester resin (B) is a value determined by gel permeation chromatography (GPC). Specifically, the determination of the molecular weight by GPC is carried out using HLC-8320GPC available from Tosoh Corporation as a measurement system, columns TSKgel GMHHR-M+TSKgel GMHHR-M (7.8 mm I.D., 30 cm) available from Tosoh Corporation, and a chloroform solvent. The weight-average molecular weight (Mw) is calculated from the molecular weight calibration curve created on the basis of the obtained measurement results using a monodisperse polystyrene standard sample.

Ester Compound (C): Compound (C)

The ester compound (C) is a compound having an ester group (—C(=O)O—) and a molecular weight of about 250 or more and about 2000 or less (preferably 250 or more and 1000 or less, more preferably 250 or more and 600 or less).

In combinational use of two or more ester compounds (C), ester compounds having a molecular weight of about 250 or more and about 2000 or less are used in combination.

Examples of the ester compound (C) include fatty acid ester compounds and aromatic carboxylic acid ester compounds.

Among these ester compounds, the ester compound (C) is preferably a fatty acid ester compound to obtain a resin molded body having high weld-line impact strength.

Examples of the fatty acid ester compound include aliphatic monocarboxylic acid esters (e.g., acetic acid ester), aliphatic dicarboxylic acid esters (e.g., succinic acid esters, adipic acid ester-containing compounds, azelaic acid esters, sebacic acid esters, stearic acid esters), aliphatic tricarboxylic acid esters (e.g., citric acid esters, isocitric acid esters), ester group-containing epoxidized compounds (epoxidized soybean oil, epoxidized linseed oil, epoxidized rapeseed fatty acid isobutyl, and epoxidized fatty acid 2-ethylhexyl), fatty acid methyl esters, and sucrose esters.

Examples of the aromatic carboxylic acid ester compound include dimethyl phthalate, diethyl phthalate, bis(2-ethylhexyl) phthalate, and terephthalic acid esters.

Among these compounds, the ester compound is preferably an aliphatic dicarboxylic acid ester or an aliphatic tricarboxylic acid ester, more preferably an adipic acid ester-containing compound or a citric acid ester, and still more preferably an adipic acid ester-containing compound to obtain a resin molded body having high weld-line impact strength.

The adipic acid ester-containing compound (a compound containing an adipic acid ester) refers to a compound of only an adipic acid ester or a mixture of an adipic acid ester and a component other than the adipic acid ester (a compound different from the adipic acid ester). The adipic acid ester-containing compound may contain 50 mass % or more of the adipic acid ester relative to the total mass of all components.

Examples of the adipic acid ester include adipic acid diesters. Specific examples include adipic acid diesters represented by general formula (AE) below.

General Formula (AE)

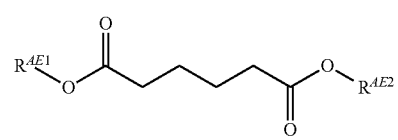

In general formula (AE), $R^{AE1}$ and $R^{AE2}$ each independently represent an alkyl group or a polyoxyalkyl group $[—(C_xH_{2x}—O)_y—R^{41}]$ (where $R^{41}$ represents an alkyl group, x represents an integer of 1 or more and 10 or less, and y represents an integer of 1 or more and 10 or less).

The alkyl group represented by $R^{AE1}$ and $R^{AE2}$ in general formula (AE) is preferably an alkyl group having 1 or more and 6 or less carbon atoms, and more preferably an alkyl group having 1 or more and 4 or less carbon atoms. The alkyl group represented by $R^{AE1}$ and $R^{AE2}$ may be a linear, branched, or cyclic alkyl group, and is preferably a linear or branched alkyl group.

The alkyl group represented by $R^{41}$ in the polyoxyalkyl group $[—(C_xH_{2x}—O)_y—R^{41}]$ represented by $R^{AE1}$ and $R^{AE2}$ in general formula (AE) is preferably an alkyl group having 1 or more and 6 or less carbon atoms, and more preferably an alkyl group having 1 or more and 4 or less carbon atoms. The alkyl group represented by $R^{41}$ may be a linear, branched, or cyclic alkyl group, and is preferably a linear or branched alkyl group.

In general formula (AE), the group represented by each reference character may be substituted with a substituent. Examples of the substituent include an alkyl group, an aryl group, and a hydroxyl group.

Examples of the citric acid ester include citric acid alkyl esters having 1 or more and 12 or less carbon atoms (preferably 1 or more and 8 or less carbon atoms). The citric acid ester may be a citric acid ester acylated with an alkyl carboxylic anhydride (e.g., a linear or branched alkyl carboxylic anhydride having 2 or more and 6 or less carbon atoms (preferably 2 or more and 3 or less carbon atoms), such as acetic anhydride, propionic anhydride, butyric anhydride, or valeric anhydride).

Polymer (D): Component (D)

The polymer (D) is a polymer selected from core-shell structure polymers having a core layer and a shell layer formed on the surface of the core layer and containing a polymer of an alkyl (meth)acrylate, and olefin polymers including about 60 mass % or more of a structural unit derived from α-olefin.

The polymer (D) may be, for example, a polymer (thermoplastic elastomer) having, for example, elasticity at ordinary temperature (25° C.) and a property of softening at high temperature like thermoplastic resin.

When the resin composition contains the polymer (D), a resin molded body having high weld-line impact strength may be obtained easily.

Core-shell Structure Polymer

The core-shell structure polymer according to the exemplary embodiment is a core-shell structure polymer having a core layer and a shell layer on the surface of the core layer.

The core-shell structure polymer is a polymer having a core layer as the innermost layer and a shell layer as the outermost layer (specifically, a polymer in which a polymer of an alkyl (meth)acrylate is bonded to a polymer serving as a core layer by graft polymerization to form a shell layer).

The core-shell structure polymer may further include one or more other layers (e.g., 1 or more and 6 or less other layers) between the core layer and the shell layer. When further including other layers, the core-shell structure polymer is a polymer in which plural polymers are bonded to a polymer serving as a core layer by graft polymerization to form a multilayer polymer.

The core layer may be, but not necessarily, a rubber layer. Examples of the rubber layer include layers formed of, for example, (meth)acrylic rubber, silicone rubber, styrene rubber, conjugated diene rubber, α-olefin rubber, nitrile rubber, urethane rubber, polyester rubber, and polyamide rubber, and copolymer rubbers of two or more of these rubbers.

Among these rubbers, the rubber layer is preferably a layer formed of, for example, (meth)acrylic rubber, silicone rubber, styrene rubber, conjugated diene rubber, or α-olefin rubber, or a copolymer rubber of two or more of these rubbers.

The rubber layer may be a rubber layer formed by crosslinking through copolymerization using a crosslinker (e.g., divinylbenzene, allyl acrylate, butylene glycol diacrylate).

Examples of the (meth)acrylic rubber include a polymer rubber produced by polymerization of a (meth)acrylic component (e.g., a (meth)acrylic acid alkyl ester having 2 or more and 6 or less carbon atoms).

Examples of the silicone rubber include a rubber formed of a silicone component (e.g., polydimethylsiloxane, polyphenylsiloxane).

Examples of the styrene rubber include a polymer rubber produced by polymerization of a styrene component (e.g., styrene, α-methylstyrene).

Examples of the conjugated diene rubber include a polymer rubber produced by polymerization of a conjugated diene component (e.g., butadiene, isoprene).

Examples of the α-olefin rubber include a polymer rubber produced by polymerization of an α-olefin component (ethylene, propylene, 2-methylpropylene).

Examples of the copolymer rubber include a copolymer rubber produced by polymerization of two or more (meth) acrylic components; a copolymer rubber produced by polymerization of a (meth)acrylic component and a silicone component; and a copolymer of a (meth)acrylic component, a conjugated diene component, and a styrene component.

Examples of the alkyl (meth)acrylate for the polymer forming the shell layer include methyl (meth)acrylate, ethyl (meth)acrylate, n-propyl (meth)acrylate, n-butyl (meth) acrylate, t-butyl (meth)acrylate, n-hexyl (meth)acrylate, 2-ethylhexyl (meth)acrylate, cyclohexyl (meth)acrylate, stearyl (meth)acrylate, and octadecyl (meth)acrylate. At least one hydrogen atom in the alkyl chain of the alkyl (meth)acrylate may be substituted with a substituent. Examples of the substituent include an amino group, a hydroxyl group, and a halogen group.

Among these, the polymer of an alkyl (meth)acrylate is preferably a polymer of an alkyl (meth)acrylate having an alkyl chain with 1 or more and 8 or less carbon atoms, more preferably a polymer of an alkyl (meth)acrylate having an alkyl chain with 1 or more and 2 or less carbon atoms, and still more preferably a polymer of an alkyl (meth)acrylate having an alkyl chain with one carbon atom to obtain a resin molded body having high weld-line impact strength. In particular, the polymer of an alkyl (meth)acrylate is preferably a copolymer of two or more alkyl acrylates each having a different number of carbon atoms in the alkyl chain.

The polymer forming the shell layer may be a polymer produced by polymerizing at least one selected from glycidyl group-containing vinyl compounds and unsaturated dicarboxylic anhydrides, other than the alkyl (meth)acrylate.

Examples of glycidyl group-containing vinyl compounds include glycidyl (meth)acrylate, glycidyl itaconate, diglycidyl itaconate, allyl glycidyl ether, styrene-4-glycidyl ether, and 4-glycidylstyrene.

Examples of unsaturated dicarboxylic anhydrides include maleic anhydride, itaconic anhydride, glutaconic anhydride, citraconic anhydride, and aconitic anhydride. Among these anhydrides, maleic anhydride is preferred.

Examples of one or more other layers between the core layer and the shell layer include layers formed of the polymers described for the shell layer.

The amount of the polymer in the shell layer is preferably 1 mass % or more and 40 mass % or less, more preferably 3 mass % or more and 30 mass % or less, and still more preferably 5 mass % or more and 15 mass % or less relative to the total amount of the core-shell structure polymer.

The average primary particle size of the core-shell structure polymer is not limited but preferably 50 nm or more and 500 nm or less, more preferably 50 nm or more and 400 nm or less, still more preferably 100 nm or more and 300 nm or less, and yet still more preferably 150 nm or more and 250 nm or less to obtain a resin molded body having high weld-line impact strength.

The average primary particle size here refers to the value obtained by the following method. Provided that the maximum diameter of each primary particle is a primary particle size, the primary particle sizes of 100 particles are determined through observation of the particles with a scanning electron microscope and averaged out to a number-average primary particle size. Specifically, the average primary particle size is determined by observing the dispersion form of the core-shell structure polymer in the resin composition using a scanning electron microscope.

The core-shell structure polymer may be produced by using a known method.

Examples of the known method include an emulsion polymerization method. Specifically, the following method is illustrated as a production method. First, a monomer mixture is subjected to emulsion polymerization to produce a core particle (core layer). Next, another monomer mixture is subjected to emulsion polymerization in the presence of the core particle (core layer) to produce a core-shell structure polymer in which a shell layer is formed around the core particle (core layer).

When other layers are formed between the core layer and the shell layer, emulsion polymerization of other monomer mixtures is repeated to produce an intended core-shell structure polymer including the core layer, other layers, and the shell layer.

Examples of commercial products of the core-shell structure polymer include "Metablen" (registered trademark) available from Mitsubishi Chemical Corporation, "Kane Ace" (registered trademark) available from Kaneka Corporation, "Paraloid" (registered trademark) available from Dow Chemical Japan Ltd., "Staphyloid" (registered trademark) available from Aica Kogyo Co., Ltd., and "Paraface" (registered trademark) available from Kuraray Co., Ltd.

Olefin Polymer

The olefin polymer is a polymer of an α-olefin and an alkyl (meth)acrylate and preferably an olefin polymer including about 60 mass % or more of the structural unit derived from the α-olefin.

Examples of the α-olefin for the olefin polymer include ethylene, propylene, and 2-methylpropylene. The α-olefin is preferably an α-olefin having 2 or more and 8 or less carbon atoms, and more preferably an α-olefin having 2 or more and 3 or less carbon atoms to obtain a resin molded body having high weld-line impact strength. Among these α-olefins, ethylene is still more preferred.

Examples of the alkyl (meth)acrylate polymerizable with the α-olefin include methyl (meth)acrylate, ethyl (meth) acrylate, n-propyl (meth)acrylate, n-butyl (meth)acrylate, t-butyl (meth)acrylate, n-hexyl (meth)acrylate, 2-ethylhexyl (meth)acrylate, cyclohexyl (meth)acrylate, stearyl (meth) acrylate, and octadecyl (meth)acrylate. To obtain a resin molded body having high weld-line impact strength, the alkyl (meth)acrylate is preferably an alkyl (meth)acrylate having an alkyl chain with 1 or more and 8 or less carbon atoms, more preferably an alkyl (meth)acrylate having an alkyl chain with 1 or more and 4 or less carbon atoms, and still more preferably an alkyl (meth)acrylate having an alkyl chain with 1 or more and 2 or less carbon atoms.

The olefin polymer here may be a polymer of ethylene and methyl acrylate to obtain a resin molded body having high weld-line impact strength.

The olefin polymer preferably includes about 60 mass % or more and about 97 mass % or less of a structural unit derived from the α-olefin and more preferably includes about 70 mass % or more and about 85 mass % or less of a structural unit derived from the α-olefin to obtain a resin molded body having high weld-line impact strength.

The olefin polymer may include structural units other than the structural unit derived from the α-olefin and the structural unit derived from the alkyl (meth)acrylate. The olefin polymer may include 10 mass % or less of other structural units relative to all structural units.

Poly(meth)acrylate Compound (E): Component (F)

The poly(meth)acrylate compound (E) is a compound (resin) including about 50 mass % or more (preferably about 70 mass % or more, more preferably about 90 mass % or more, still more preferably about 100 mass %) of a structural unit derived from an alkyl (meth)acrylate.

When the resin composition contains the poly(meth) acrylate compound (E), a resin molded body having high weld-line impact strength may be obtained easily.

The poly(meth)acrylate compound (E) may be a compound (resin) including a structural unit derived from a monomer other than the (meth)acrylate.

The poly(meth)acrylate compound (E) may include one structural unit (monomer-derived unit) or two or more structural units.

Examples of the alkyl (meth)acrylate include methyl (meth)acrylate, ethyl (meth)acrylate, n-propyl (meth)acrylate, n-butyl (meth)acrylate, n-pentyl (meth)acrylate, n-hexyl (meth)acrylate, n-heptyl (meth)acrylate, n-octyl (meth)acrylate, n-decyl (meth)acrylate, isopropyl (meth) acrylate, isobutyl (meth)acrylate, t-butyl (meth)acrylate, isopentyl (meth)acrylate, amyl (meth)acrylate, neopentyl (meth)acrylate, isohexyl (meth)acrylate, isoheptyl (meth) acrylate, isooctyl (meth)acrylate, 2-ethylhexyl (meth)acrylate, octyl (meth)acrylate, decyl (meth)acrylate, cyclohexyl (meth)acrylate, and dicyclopentanyl (meth)acrylate.

Among these, the alkyl (meth)acrylate may be an alkyl (meth)acrylate having an alkyl chain with 1 or more and 8 or less carbon atoms (preferably 1 or more and 4 or less carbon atoms, more preferably 1 or more and 2 or less carbon atoms, and still more preferably 1 carbon atom) to obtain a resin molded body having high weld-line impact strength.

As the poly(meth)acrylate compound (E) has a shorter alkyl chain, the poly(meth)acrylate compound (E) has a SP value closer to that of the polyester resin (B), which may result in better compatibility between the poly(meth)acrylate compound (E) and the polyester resin (B) and may ensure higher haze.

In other words, the poly(meth)acrylate compound (E) may be a polymer including about 50 mass % or more (preferably about 70 mass % or more, more preferably about 90 mass % or more, still more preferably about 100 mass %) of a structural unit derived from an alkyl (meth)acrylate having an alkyl chain with 1 or more and 8 or less carbon atoms (preferably 1 or more and 4 or less carbon atoms, more preferably 1 or more and 2 or less carbon atoms, and still more preferably 1 carbon atom).

The poly(meth)acrylate compound (E) may be a polymer including 100 mass % of a structural unit derived from an alkyl (meth)acrylate having an alkyl chain with 1 or more and 8 or less carbon atoms (preferably 1 or more and 4 or less carbon atoms, more preferably 1 or more and 2 or less carbon atoms, still more preferably 1 carbon atom). In other words, the poly(meth)acrylate compound (E) may be a poly(alkyl (meth)acrylate) having an alkyl chain with 1 or more and 8 or less carbon atoms (preferably 1 or more and 4 or less carbon atoms, more preferably 1 or more and 2 or less carbon atoms, still more preferably 1 carbon atom). The poly(alkyl (meth)acrylate) having an alkyl chain with 1 carbon atom may be poly(methyl methacrylate).

Examples of the monomer other than the (meth)acrylate in the poly(meth)acrylate compound (E) include styrenes [e.g., monomers having styrene skeletons, such as styrene, alkylated styrenes (e.g., α-methylstyrene, 2-methylstyrene, 3-methylstyrene, 4-methylstyrene, 2-ethylstyrene, 3-ethylstyrene, 4-ethylstyrene), halogenated styrenes (e.g., 2-chlorostyrene, 3-chlorostyrene, 4-chlorostyrene), vinylnaphthalenes (e.g., 2-vinylnaphthalene), and hydroxystyrenes (e.g., 4-ethenylphenol)]; and unsaturated dicarboxylic anhydrides [e.g., compounds having an ethylenic double bond and a dicarboxylic anhydride group, such as maleic anhydride, itaconic anhydride, glutaconic anhydride, citraconic anhydride, and aconitic anhydride].

The weight-average molecular weight (Mw) of the poly (meth)acrylate compound (E) is not limited but may be 15,000 or more and 120,000 or less (preferably more than 20,000 and 100,000 or less, more preferably 22,000 or more and 100,000 or less, and still more preferably 25,000 or more and 100,000 or less).

To obtain a resin molded body having high weld-line impact strength, the weight-average molecular weight (Mw) of the poly(meth)acrylate compound (E) is preferably less than 50,000, more preferably 40,000 or less, and still more preferably 35,000 or less. The weight-average molecular weight (Mw) of the poly(meth)acrylate compound (E) is preferably 15,000 or more.

The weight-average molecular weight (Mw) of the poly (meth)acrylate compound (E) is a value determined by gel permeation chromatography (GPC). Specifically, the determination of the molecular weight by GPC is carried out using HLC-8320GPC available from Tosoh Corporation as a measurement system and using column TSKgel α-M available from Tosoh Corporation and a tetrahydrofuran solvent. The weight-average molecular weight (Mw) is calculated from the molecular weight calibration curve created on the basis of the obtained measurement results using a monodisperse polystyrene standard sample.

Amount or Mass Ratio for Components (A) to (E)

The amount or the mass ratio of each component will be described. The amount or the mass ratio of each component may be in the following range to obtain a resin molded body having high weld-line impact strength. The shortened name for each component is as described below.

Component (A)=cellulose acylate (A)
Component (B)=polyester resin (B)
Component (C)=ester compound (C)
Component (D)=polymer (D)
Component (E)=poly(meth)acrylate compound (E)

The mass ratio ((B)/(A)) of the component (B) to the component (A) is about 0.05 or more and about 0.5 or less as described above. The mass ratio ((B)/(A)) of the component (B) to the component (A) is preferably about 0.05 or more and about 0.25 or less, and more preferably about 0.05 or more and about 0.2 or less.

The mass ratio ((C)/(A)) of the component (C) to the component (A) is about 0.02 or more and about 0.15 or less as described above. The mass ratio ((C)/(A)) of the component (C) to the component (A) is preferably about 0.04 or more and about 0.15 or less, and more preferably about 0.04 or more and about 0.1 or less.

The mass ratio ((D)/(A)) of the component (D) to the component (A) is preferably about 0.001 or more and about 0.2 or less, more preferably about 0.01 or more and about 0.2 or less, and still more preferably about 0.05 or more and about 1.0 or less.

The mass ratio ((E)/(A)) of the component (E) to the component (A) is preferably 0.05 or more and 0.5 or less, more preferably 0.05 or more and 0.25 or less, and still more preferably 0.05 or more and 0.2 or less.

The amount of the component (A) relative to the resin composition is preferably 50 mass % or more, more preferably 60 mass % or more, and still more preferably 70 mass % or more.

Other Components

The resin composition according to the exemplary embodiment may contain other components.

Examples of other components include a flame retardant, a compatibilizer, an antioxidant, a release agent, a light resisting agent, a weathering agent, a colorant, a pigment, a modifier, an anti-drip agent, an antistatic agent, a hydrolysis inhibitor, a filler, and reinforcing agents (e.g., glass fiber, carbon fiber, talc, clay, mica, glass flakes, milled glass, glass beads, crystalline silica, alumina, silicon nitride, aluminum nitride, and boron nitride).

As needed, components (additives), such as a reactive trapping agent and an acid acceptor for avoiding release of acetic acid, may be added. Examples of the acid acceptor include oxides, such as magnesium oxide and aluminum oxide; metal hydroxides, such as magnesium hydroxide, calcium hydroxide, aluminum hydroxide, and hydrotalcite; calcium carbonate; and talc.

Examples of the reactive trapping agent include epoxy compounds, acid anhydride compounds, and carbodiimides.

The amount of each of these components may be 0 mass % or more and 5 mass % or less relative to the total amount of the resin composition. The expression "0 mass %" means that the resin composition is free of a corresponding one of other components.

The resin composition according to the exemplary embodiment may contain resins other than the resins (the cellulose acylate (A), the polyester resin (B), the poly(meth)acrylate compound (E), and the like). When the resin composition contains other resins, the amount of other resins relative to the total amount of the resin composition may be 5 mass % or less and is preferably less than 1 mass %. More preferably, the resin composition is free of other resins (i.e., 0 mass %).

Examples of other resins include thermoplastic resins known in the related art. Specific examples include polycarbonate resin; polypropylene resin; polyester resin; polyolefin resin; polyester-carbonate resin; polyphenylene ether resin; polyphenylene sulfide resin; polysulfone resin; polyether sulfone resin; polyarylene resin; polyetherimide resin; polyacetal resin; polyvinyl acetal resin; polyketone resin; polyether ketone resin; polyether ether ketone resin; polyaryl ketone resin; polyether nitrile resin; liquid crystal resin; polybenzimidazole resin; polyparabanic acid resin; a vinyl polymer or a vinyl copolymer produced by polymerizing or copolymerizing at least one vinyl monomer selected from the group consisting of an aromatic alkenyl compound, a methacrylic acid ester, an acrylic acid ester, and a vinyl cyanide compound; a diene-aromatic alkenyl compound copolymer; a vinyl cyanide-diene-aromatic alkenyl compound copolymer; an aromatic alkenyl compound-diene-vinyl cyanide-N-phenylmaleimide copolymer; a vinyl cyanide-(ethylene-diene-propylene (EPDM))-aromatic alkenyl compound copolymer; polyvinyl chloride resin; and chlorinated polyvinyl chloride resin. These resins may be used alone or in combination of two or more.

Method for Producing Resin Composition

The resin composition according to the exemplary embodiment is produced by, for example, melt-kneading a mixture containing the cellulose acylate (A), the polyester resin (B), and the ester compound (C), and as needed, other components. Alternatively, the resin composition according to the exemplary embodiment is also produced by, for example, dissolving the above-described components in a solvent.

An apparatus used for melt kneading is, for example, a known apparatus. Specific examples of the apparatus include a twin-screw extruder, a Henschel mixer, a Banbury mixer, a single-screw extruder, a multi-screw extruder, and a co-kneader.

Resin Molded Body

A resin molded body according to an exemplary embodiment contains the resin composition according to the exemplary embodiment. In other words, a resin molded body according to an exemplary embodiment has the same composition as the resin composition according to the exemplary embodiment.

A method for forming the resin molded body according to the exemplary embodiment may be injection molding from the viewpoint of a high degree of freedom in shaping. For this point, the resin molded body may be an injection-molded body formed by injection molding.

The cylinder temperature during injection molding is, for example, 160° C. or higher and 280° C. or lower, and preferably 180° C. or higher and 260° C. or lower. The mold temperature during injection molding is, for example, 40° C. or higher and 90° C. or lower, and preferably 60° C. or higher and 80° C. or lower.

Injection molding may be performed using a commercially available apparatus, such as NEX 500 available from Nissei Plastic Industrial Co., Ltd., NEX 150 available from Nissei Plastic Industrial Co., Ltd., NEX 70000 available from Nissei Plastic Industrial Co., Ltd., PNX 40 available from Nissei Plastic Industrial Co., Ltd., and SE50D available from Sumitomo Heavy Industries.

The molding method for producing the resin molded body according to the exemplary embodiment is not limited to injection molding described above. Examples of the molding method include extrusion molding, blow molding, heat press molding, calendar molding, coating molding, cast molding, dipping molding, vacuum molding, and transfer molding.

The resin molded body according to the exemplary embodiment is used in various applications, such as electrical and electronic devices, office machines, home appliances, automotive interior materials, toys, and containers. More specifically, the resin molded body is used in housings of electrical and electronic devices and home appliances; various parts of electrical and electronic devices and home appliances; automotive interior parts; block assembly toys; plastic model kits; cases for CD-ROMs, DVDs, and the like; tableware; drink bottles; food trays; wrapping materials; films; and sheets.

EXAMPLES

The present invention will be described below in more detail by way of Examples, but the present invention is not limited to these Examples. The unit "part(s)" refers to "part(s) by mass" unless otherwise specified.

Preparation of Materials

The following materials are prepared.

Preparation of Cellulose Acylate (A)

Synthesis Example 1 (Synthesis of CD1)

Synthesis of Carboxylated Hydrogenated Cardanol (a)

Hydrogenated cardanol (m-n-pentadecylphenol available from ACROS Organics), 80 kg, is dissolved in 120 L of methanol. To the mixture is added an aqueous solution prepared by dissolving 64 kg of sodium hydroxide in 40 L of distilled water. A solution prepared by dissolving 66 kg of monochloroacetic acid available from Kanto Chemical Co., Inc. in 50 L of methanol is then added dropwise at room temperature. After completion of dropwise addition, the mixture is continuously stirred while being refluxed at 73° C. for four hours. After the reaction solution is cooled to room temperature, the reaction solution is acidified with dilute hydrochloric acid until pH=1. To the reaction solution are added 250 L of methanol, 500 L of diethyl ether, and furthermore 200 L of distilled water. The aqueous layer is then separated and discarded, and the ether layer is washed with 400 L of distilled water twice. The ether layer is dried over anhydrous magnesium and then separated by filtering. The filtrate is concentrated under reduced pressure to provide a yellow-brown powder crude product as a solid. This crude product is recrystallized from n-hexane, followed by vacuum drying. This provides 46 kg of white powder of carboxylated hydrogenated cardanol (a).

Synthesis of Acetic Anhydride-Acetic Acid-Carboxylated Hydrogenated Cardanol Acid Anhydride Mixture (b)

To 4.6 kg of carboxylated hydrogenated cardanol (a) is added 1500 mL of acetic anhydride. The mixture is stirred under heating at 100° C. for one hour. This provides an acetic anhydride-acetic acid-carboxylated hydrogenated cardanol acid anhydride mixture (b).

Synthesis of Intermediate Cellulose Acylate (c)

Cellulose (Nippon Paper Chemicals Co., Ltd., product name: KC Flock, grade: W-50GK), 600 g (based on dry weight), is dispersed in 9000 mL of dimethyl sulfoxide. The dispersion is stirred for one hour, and dimethyl sulfoxide is removed through suction filtration for 10 minutes. This provides activated cellulose.

A dioxane solution prepared by dissolving 300 g of dimethylamino pyridine in 15000 mL of dehydrated dioxane is added to the activated cellulose to form a dispersion. The dispersion is added to the acetic anhydride-acetic acid-carboxylated hydrogenated cardanol acid anhydride mixture (b). The mixture is stirred under heating at 100° C. for six hours, and the reaction suspension is subjected to solid-liquid separation through suction filtration. The solid obtained as a residue is washed and dried to provide 1.2 kg of intermediate cellulose acylate (c).

Synthesis of Final Cellulose Acylate (d)

To 1.2 kg of the obtained intermediate product cellulose acylate (c) are added 900 ml of pyridine and 65 ml of acetic anhydride. After the mixture is stirred under heating at 100° C. for 18 hours, the reaction liquid is distilled off to provide 1 kg of final cellulose acylate (d) (CD1).

Part of the final cellulose acylate (d) is treated in the following manner for analysis. First, a pyridine solution prepared by dissolving 1.0 g of dimethylamino pyridine in 20 mL of dehydrated pyridine is added to 0.3 g of the final cellulose acylate (d), and 32 ml of propionic anhydride is further added thereto. After the mixture is stirred under heating at 100° C. for three hours, 550 ml of a water-methanol mixed solution (volume ratio 1:1) is slowly added dropwise to cause reprecipitation, and the solid is separated by filtering. The solid obtained in reprecipitation is washed with 50 ml of a water-methanol mixed solution (volume ratio 1:1) three times and vacuum-dried at 105° C. for five hours. With the above-described treatment, the residual hydroxy groups of the solid (long-chain short-chain bonded cellulose derivative) are converted into propionyl groups, whereby the solid is modified so as to be soluble in deuterated chloroform.

The modified solid is dissolved in deuterated chloroform, and the degree of substitution of the hydroxy groups is determined by $H^1$-NMR (Bruker Corporation, product name: AV-400, 400 MHz), and the degree of substitution of the hydroxy groups of the solid before modification is evaluated.

In the obtained CD1, the amount of the cardanol-derived group on a number basis per glucose unit is determined by using the method described above and found to be 0.6 groups.

Synthesis Example 2 (Synthesis of CD2)

Final cellulose acylate (d) (CD2) is produced in the same manner as in Synthesis Example 1 except that the amount of the carboxylated hydrogenated cardanol (a) added in the synthesis of the acetic anhydride-acetic acid-carboxylated hydrogenated cardanol acid anhydride mixture (b) is changed from 4.6 kg to 1.2 kg.

In the obtained CD2, the amount of the cardanol-derived group on a number basis per glucose unit is determined by using the method described above and found to be 0.16 groups.

Synthesis Example 3 (Synthesis of CD3)

Final cellulose acylate (d) (CD3) is produced in the same manner as in Synthesis Example 1 except that the amount of the carboxylated hydrogenated cardanol (a) added in the synthesis of the acetic anhydride-acetic acid-carboxylated hydrogenated cardanol acid anhydride mixture (b) is changed from 4.6 kg to 10.5 kg.

In the obtained CD3, the amount of the cardanol-derived group on a number basis per glucose unit is determined by using the method described above and found to be 2.5 groups.

Synthesis Example 4 (Synthesis of CD4)

Synthesis of Acetic Anhydride-Stearic Anhydride Mixture (e)

To 1 L of acetic anhydride is added 35 kg of stearic acid. The mixture is stirred under heating at 100° C. for one hour. This provides 40 kg of an acetic anhydride-stearic anhydride mixture (e).

Synthesis of Intermediate Cellulose Acylate (f)

Cellulose (Nippon Paper Chemicals Co., Ltd., product name: KC Flock, grade: W-50GK), 1.2 kg (based on dry weight), is dispersed in 18 L of pure water. The dispersion is stirred for 24 hours, and pure water is removed through suction filtration. Next, the obtained cellulose is dispersed in 18 L of acetic acid, and the dispersion is stirred for 24 hours, and acetic acid is removed through suction filtration. Subsequently, the obtained cellulose is dispersed in 18 L of heptanoic acid, and the dispersion is stirred for 24 hours, and heptanoic acid is removed through suction filtration. Furthermore, the obtained cellulose is mixed with 1.8 kg of stearic acid, and the cellulose is stirred for eight hours in stearic acid melted at 75° C. Stearic acid is removed through filtration under heating for 20 minutes. This provides activated cellulose.

To 40 kg of the acetic anhydride-stearic anhydride mixture (e) is added 15 L of dioxane. The mixture is maintained at 50° C., and the activated cellulose is added to and uniformly dispersed in the mixture. A dioxane solution prepared by dissolving 8 mL of perchloric acid (70%) in 7.5 L of dehydrated dioxane is further added. The mixture is stirred under heating at 50° C. for four hours, and the reaction suspension is subjected to solid-liquid separation through suction filtration. The solid obtained as a residue is washed and dried to provide 20 kg of intermediate cellulose acylate (f).

Synthesis of Final Cellulose Acylate (g)

Next, 17 L of dioxane is added to 5 kg of the obtained intermediate product cellulose acylate (f). The mixture is stirred at 90° C. for one hour to prepare a dispersion. The dispersion is cooled to 30° C., and 11 L of acetic anhydride is added. A dioxane solution prepared by dissolving 1.5 mL of perchloric acid (70%) in 2.5 L of dioxane is added, and the mixture is then stirred under heating at 30° C. for three hours. While the reaction solution is stirred, the crude product is then precipitated and separated by dropwise addition of 100 L of methanol. The crude product is washed and dried to produce the final product cellulose acylate (g) (CD4).

The final product cellulose acylate (g), 15 g, is washed three times with 600 mL of isopropyl alcohol heated to 60° C. and washed one time with 600 mL of pure water of room temperature. The washed solid is vacuum-dried at 105° C. for five hours.

Part of the obtained solid (long-chain short-chain bonded cellulose derivative) is treated in the same manner as in Synthesis Example 1 and analyzed with NMR.

In the obtained CD4, the amount of the stearoyl group on a number basis per glucose unit is determined by using the method described above and found to be 2.0 groups.

Synthesis Example 5 (Synthesis of CD5)

The final cellulose acylate (g) (CD5) is produced in the same manner as in Synthesis Example 4 except that the amount of stearic acid added in the synthesis of the acetic anhydride-stearic anhydride mixture (e) is changed from 35 kg to 20 kg.

In the obtained CD5, the amount of the stearoyl group on a number basis per glucose unit is determined by using the method described above and found to be 1.5 groups. Synthesis Example 6 (Synthesis of CD6)

Final cellulose acylate (d) (CD6) is produced in the same manner as in Synthesis Example 1 except that the amount of the carboxylated hydrogenated cardanol (a) added in the synthesis of the acetic anhydride-acetic acid-carboxylated hydrogenated cardanol acid anhydride mixture (b) is changed from 4.6 kg to 0.8 kg.

In the obtained CD6, the amount of the cardanol-derived group on a number basis per glucose unit is determined by using the method described above and found to be 0.14 groups.

Synthesis Example 7 (Synthesis of CD7)

Final cellulose acylate (d) (CD7) is produced in the same manner as in Synthesis Example 1 except that the amount of the carboxylated hydrogenated cardanol (a) added in the synthesis of the acetic anhydride-acetic acid-carboxylated hydrogenated cardanol acid anhydride mixture (b) is changed from 4.6 kg to 12 kg.

In the obtained CD7, the amount of the cardanol-derived group on a number basis per glucose unit is determined by using the method described above and found to be 2.6 groups.

Provision of Polyester Resin (B)
  PE1: "Ingeo 3001D (NatureWorks LLC)", polylactic acid
  PE2: "Terramac TE-2000 (Unitika, Ltd.)", polylactic acid
  PE3: "Lacea H-100 (Mitsui Chemicals, Inc.)", polylactic acid
  PE4: "Aonilex X151A (Kaneka Corporation)", polyhydroxybutyrate-hexanoate
  PE5: "Aonilex X131A (Kaneka Corporation)", polyhydroxybutyrate-hexanoate
  PE6: "Vylopet EMC-500 (Toyobo Co., Ltd.)", polyethylene terephthalate Provision of Ester Compound (C)
  CE1: "Daifatty 101 (Daihachi Chemical Industry Co., Ltd.)", adipic acid ester-containing compound, molecular weight of adipic acid ester=326 to 378
  CE2: "DOA (Daihachi Chemical Industry Co., Ltd.)" 2-ethylhexyl adipate, molecular weight=371
  CE3: "D610A (Mitsubishi Chemical Corporation)", di-n-alkyl adipate (C6, C8, and C10) mixture (R—OOC(CH$_2$)$_4$COO—R, R=n-C$_6$H$_{13}$, n-C$_8$H$_{17}$, and n-C$_{10}$H$_{21}$), molecular weight=314 to 427
  CE4: "HA-5 (Kao Corporation)", adipic acid polyester, molecular weight=750
  CE5: "D623 (Mitsubishi Chemical Corporation)", adipic acid polyester, molecular weight=1800
  CE6: "Citrofol AI (jungbunzlauer)", triethyl citrate, molecular weight=276
  CE7: "DBS (Daihachi Chemical Industry Co., Ltd.)" dibutyl sebacate, molecular weight=314
  CE8: "DESU (Daihachi Chemical Industry Co., Ltd.)", diethyl succinate, molecular weight=170
  CE9: "D645 (Mitsubishi Chemical Corporation)", adipic acid polyester, molecular weight=2200 Provision of Polymer (D)
  AE1: "Metablen W-600A (Mitsubishi Chemical Corporation)", core-shell structure polymer (a polymer in which a "homopolymer rubber formed from methyl methacrylate and 2-ethylhexyl acrylate" is bonded to a "copolymer rubber formed from 2-ethylhexyl acrylate and n-butyl acrylate" serving as a core layer by graft polymerization to form a shell layer), average primary particle size=200 nm
  AE2: "Metablen S-2006 (Mitsubishi Chemical Corporation)", core-shell structure polymer (a polymer including a silicone-acrylic rubber as a core layer and a methyl methacrylate polymer as a shell layer), average primary particle size=200 nm
  AE3: "Paraloid EXL-2315 (Dow Chemical Rohm and Haas)", core-shell structure polymer (a polymer in which a "methyl methacrylate polymer" is bonded to a "rubber mainly composed of polybutyl acrylate" serving as a core layer by graft polymerization to form a shell layer), average primary particle size=300 nm
  AE4: "Lotryl 29MA03 (Arkema K.K.)", olefin polymer (an olefin polymer that is a copolymer of ethylene and methyl acrylate and includes 71 mass % of the structural unit derived from ethylene) Provision of Poly(meth)acrylate Compound (E)
  PM1: "Delpet 720V (Asahi Kasei Corporation)", polymethyl methacrylate (PMMA), Mw=55,000
  PM2: "Delpowder 500V (Asahi Kasei Corporation)", polymethyl methacrylate (PMMA), Mw=25,000
  PM3: "Sumipex MHF (Sumitomo Chemical Co., Ltd.)", polymethyl methacrylate (PMMA), Mw=9,5000
  PM4: "Delpet 980N (Asahi Kasei Corporation)", homo-copolymer of methyl methacrylate (MMA), styrene (St), and maleic anhydride (MAH) (mass ratio=MMA:St:MAH=67:14:19), Mw=110,000

Examples 1 to 35 and Comparative Examples 1 to 16

Kneading and Injection Molding

A resin composition (pellets) is prepared by performing kneading with a twin-screw kneader (TEX 41SS available from Toshiba Machine Co., Ltd.) at the preparation composition ratio shown in Table 1 to Table 3 and the kneading temperature (cylinder temperature) shown in Table 1 to Table 3.

The obtained pellets are molded into the following resin molded bodies (1) and (3) using an injection molding machine (NEX 140111 available from Nissei Plastic Industrial Co., Ltd.) at an injection peak pressure of less than 180 MPa and the molding temperature (cylinder temperature) and the mold temperature shown in Table 1 to Table 3. The following resin molded body (2) is further formed by using a mold having a gate on each side in the longitudinal direction.

(1) ISO multi-purpose dumbbell (measurement part 10 mm wide×4 mm thick)
(2) Weld line-containing ISO multi-purpose test piece (measurement part 10 mm wide×4 mm thick) having weld line at center in longitudinal direction
(3) D12 small plate (size: 60 mm×60 mm, 2 mm thick)

Evaluation

The obtained molded bodies are subjected to the following evaluation. The evaluation results are shown in Table 1 to Table 3.

Weld-line Impact Strength

The obtained weld line-containing ISO multi-purpose test piece is notched to form a notch (single notch, notch type A, the remaining width of the notched test piece: 8 mm) in the weld line zone by using a notching tool (A4E available from Toyo Seiki Seisaku-sho, Ltd.) in accordance with the method described in ISO 179-1 (2010). The test piece is placed in an impact strength measuring device (automated Charpy impact tester model CHN3 available from Toyo Seiki Seisaku-sho, Ltd.) so as to undergo an edgewise impact, and the Charpy notched impact strength (weld-line impact strength) in the weld line at 23° C. is determined.

Charpy Impact Strength

The obtained ISO multi-purpose test piece is notched to form a notch (single notch, notch type A, the remaining width of the notched test piece: 8 mm) by using a notching tool (A4E available from Toyo Seiki Seisaku-sho, Ltd.) in accordance with the method described in ISO 179-1 (2010). The test piece is placed in an impact strength measuring device (automated Charpy impact tester model CHN3 available from Toyo Seiki Seisaku-sho, Ltd.) so as to undergo an edgewise impact, and the notched impact strength at 23° C. is determined.

Plane Impact Strength

A steel ball having a diameter of 50 mm and a mass of 500 g is dropped onto and collides with the obtained D12 small plate from a height of 0.2, 0.4, 0.6, 0.8, and 1.0 m. This test is performed three times for each drop height. The drop height for the steel ball that completely breaks part of the plate into pieces two or more times is evaluated as dropped steel ball resistance.

Percentage of Water-Absorption Dimensional Change

The obtained D12 small plate is left to stand at room temperature for 24 hours or longer after molding. The lengths of the four sides of the plate are measured, and the average length in the machine direction (MD) and the average length in the transverse direction (TD) (a direction perpendicular to the MD) are calculated as the dimensions before water absorption. The plate is immersed in water at room temperature for 72 hours, and the average length in the machine direction (MD) and the average length in the transverse direction (TD) are similarly calculated as the dimensions after water absorption. From these dimensions, the percentages of water-absorption dimensional change in two directions are calculated in accordance with the following formula, and the average of the percentages of water-absorption dimensional change is obtained as a percentage of water-absorption dimensional change.

Percentage (%) of water-absorption dimensional change={(dimension after water absorption)/(dimension before water absorption)−1}×100

TABLE 1

| Example/Comparative Example | Composition (A) | (B) | (C) | (D) | (E) | Composition Ratio (B)/(A) | (C)/(A) | (D)/(A) | (E)/(A) | Process Temperature Kneading Temperature (° C.) |
|---|---|---|---|---|---|---|---|---|---|---|
| Example 1 | CD1 = 100 | PE1 = 10 | CE1 = 10 | | | 0.1 | 0.1 | | | 200 |
| Example 2 | CD1 = 100 | PE1 = 10 | CE1 = 10 | AE1 = 10 | | 0.1 | 0.1 | 0.1 | | 200 |
| Example 3 | CD2 = 100 | PE1 = 10 | CE1 = 10 | AE1 = 10 | | 0.1 | 0.1 | 0.1 | | 200 |
| Example 4 | CD3 = 100 | PE1 = 10 | CE1 = 10 | AE1 = 10 | | 0.1 | 0.1 | 0.1 | | 200 |
| Example 5 | CD4 = 100 | PE1 = 10 | CE1 = 10 | AE1 = 10 | | 0.1 | 0.1 | 0.1 | | 200 |
| Example 6 | CD5 = 100 | PE1 = 10 | CE1 = 10 | AE1 = 10 | | 0.1 | 0.1 | 0.1 | | 200 |
| Example 7 | CD6 = 100 | PE1 = 10 | CE1 = 10 | AE1 = 10 | | 0.1 | 0.1 | 0.1 | | 200 |
| Example 8 | CD7 = 100 | PE1 = 10 | CE1 = 10 | AE1 = 10 | | 0.1 | 0.1 | 0.1 | | 200 |
| Example 9 | CD1 = 100 | PE2 = 10 | CE1 = 10 | AE1 = 10 | | 0.1 | 0.1 | 0.1 | | 200 |
| Example 10 | CD1 = 100 | PE3 = 10 | CE1 = 10 | AE1 = 10 | | 0.1 | 0.1 | 0.1 | | 200 |
| Example 11 | CD1 = 100 | PE4 = 10 | CE1 = 10 | AE1 = 10 | | 0.1 | 0.1 | 0.1 | | 200 |
| Example 12 | CD1 = 100 | PE5 = 10 | CE1 = 10 | AE1 = 10 | | 0.1 | 0.1 | 0.1 | | 200 |
| Example 13 | CD1 = 100 | PE6 = 10 | CE1 = 10 | AE1 = 10 | | 0.1 | 0.1 | 0.1 | | 200 |
| Example 14 | CD1 = 100 | PE1 = 10 | CE2 = 10 | AE1 = 10 | | 0.1 | 0.1 | 0.1 | | 200 |
| Example 15 | CD1 = 100 | PE1 = 10 | CE3 = 10 | AE1 = 10 | | 0.1 | 0.1 | 0.1 | | 200 |
| Example 16 | CD1 = 100 | PE1 = 10 | CE4 = 10 | AE1 = 10 | | 0.1 | 0.1 | 0.1 | | 200 |
| Example 17 | CD1 = 100 | PE1 = 10 | CE5 = 10 | AE1 = 10 | | 0.1 | 0.1 | 0.1 | | 200 |
| Example 18 | CD1 = 100 | PE1 = 10 | CE6 = 10 | AE1 = 10 | | 0.1 | 0.1 | 0.1 | | 200 |
| Example 19 | CD1 = 100 | PE1 = 10 | CE7 = 10 | AE1 = 10 | | 0.1 | 0.1 | 0.1 | | 200 |

| Example/Comparative Example | Process Temperature Molding Temperature (° C.) | Mold Temperature (° C.) | Evaluation Weld-line Impact Strength (WL) (kJ/m$^2$) | Charpy Impact Strength (Non-WL) (kJ/m$^2$) | (WL)/(Non-WL) | Plane Impact Strength | Percentage (%) of Water-Absorption Dimensional Change |
|---|---|---|---|---|---|---|---|
| Example 1 | 200 | 50 | 12 | 16 | 0.75 | 0.8 | 0.32 |
| Example 2 | 200 | 50 | 16 | 20 | 0.80 | 1 | 0.35 |
| Example 3 | 200 | 50 | 16 | 20 | 0.80 | 1 | 0.32 |
| Example 4 | 200 | 50 | 15 | 20 | 0.75 | 1 or more | 0.21 |
| Example 5 | 200 | 50 | 18 | 22 | 0.82 | 1 | 0.34 |
| Example 6 | 200 | 50 | 16 | 21 | 0.76 | 1 or more | 0.15 |
| Example 7 | 200 | 50 | 10 | 14 | 0.71 | 0.6 | 0.38 |
| Example 8 | 200 | 50 | 10 | 15 | 0.67 | 0.6 | 0.39 |
| Example 9 | 200 | 50 | 16 | 20 | 0.80 | 1 | 0.29 |
| Example 10 | 200 | 50 | 14 | 18 | 0.78 | 0.8 | 0.35 |
| Example 11 | 200 | 50 | 18 | 24 | 0.75 | 1 | 0.32 |
| Example 12 | 200 | 50 | 18 | 25 | 0.72 | 0.8 | 0.31 |
| Example 13 | 200 | 50 | 10 | 14 | 0.71 | 0.6 | 0.39 |
| Example 14 | 200 | 50 | 14 | 18 | 0.78 | 0.8 | 0.32 |
| Example 15 | 200 | 50 | 15 | 20 | 0.75 | 0.8 | 0.33 |
| Example 16 | 200 | 50 | 14 | 17 | 0.82 | 0.8 | 0.34 |
| Example 17 | 200 | 50 | 13 | 16 | 0.81 | 0.8 | 0.33 |
| Example 18 | 200 | 50 | 10 | 13 | 0.77 | 0.6 | 0.39 |
| Example 19 | 200 | 50 | 10 | 14 | 0.71 | 0.6 | 0.38 |

TABLE 2

| Example/Comparative Example | Composition (A) | (B) | (C) | (D) | (E) | Composition Ratio (B)/(A) | (C)/(A) | (D)/(A) | (E)/(A) | Process Temperature Kneading Temperature (° C.) |
|---|---|---|---|---|---|---|---|---|---|---|
| Example 20 | CD1 = 100 | PE1 = 5 | CE1 = 10 | | | 0.05 | 0.1 | | | 200 |
| Example 21 | CD1 = 100 | PE1 = 50 | CE1 = 10 | | | 0.5 | 0.1 | | | 190 |
| Example 22 | CD1 = 100 | PE1 = 5 | CE1 = 10 | AE1 = 10 | | 0.05 | 0.1 | 0.1 | | 200 |

TABLE 2-continued

| | | | | | | | | | |
|---|---|---|---|---|---|---|---|---|---|
| Example 23 | CD1 = 100 | PE1 = 50 | CE1 = 10 | AE1 = 10 | | 0.5 | 0.1 | 0.1 | | 190 |
| Example 24 | CD1 = 100 | PE1 = 10 | CE1 = 2 | | | 0.1 | 0.02 | | | 200 |
| Example 25 | CD1 = 100 | PE1 = 10 | CE1 = 15 | | | 0.1 | 0.15 | | | 190 |
| Example 26 | CD1 = 100 | PE1 = 10 | CE1 = 2 | AE1 = 10 | | 0.1 | 0.02 | 0.1 | | 220 |
| Example 27 | CD1 = 100 | PE1 = 10 | CE1 = 15 | AE1 = 10 | | 0.1 | 0.15 | 0.1 | | 190 |
| Example 28 | CD1 = 100 | PE1 = 10 | CE1 = 10 | AE2 = 10 | | 0.1 | 0.1 | 0.1 | | 200 |
| Example 29 | CD1 = 100 | PE1 = 10 | CE1 = 10 | AE3 = 10 | | 0.1 | 0.1 | 0.1 | | 200 |
| Example 30 | CD1 = 100 | PE1 = 10 | CE1 = 10 | AE4 = 10 | | 0.1 | 0.1 | 0.1 | | 200 |
| Example 31 | CD1 = 100 | PE1 = 10 | CE1 = 10 | | PM1 = 5 | 0.1 | 0.1 | | 0.05 | 200 |
| Example 32 | CD1 = 100 | PE1 = 10 | CE1 = 10 | AE1 = 10 | PM1 = 5 | 0.1 | 0.1 | 0.1 | 0.05 | 200 |
| Example 33 | CD1 = 100 | PE1 = 10 | CE1 = 10 | AE1 = 10 | PM2 = 5 | 0.1 | 0.1 | 0.1 | 0.05 | 200 |
| Example 34 | CD1 = 100 | PE1 = 10 | CE1 = 10 | AE1 = 10 | PM3 = 5 | 0.1 | 0.1 | 0.1 | 0.05 | 200 |
| Example 35 | CD1 = 100 | PE1 = 10 | CE1 = 10 | AE1 = 10 | PM4 = 5 | 0.1 | 0.1 | 0.1 | 0.05 | 200 |

| | Process Temperature | | Evaluation | | | | |
|---|---|---|---|---|---|---|---|
| Example/ Comparative Example | Molding Temperature (°C.) | Mold Temperature (°C.) | Weld-line Impact Strength (WL) (kJ/m$^2$) | Charpy Impact Strength (Non-WL) (kJ/m$^2$) | (WL)/(Non-WL) | Plane Impact Strength | Percentage (%) of Water-Absorption Dimensional Change |
| Example 20 | 200 | 50 | 12 | 16 | 0.75 | 0.8 | 0.32 |
| Example 21 | 190 | 50 | 12 | 16 | 0.75 | 0.6 | 0.33 |
| Example 22 | 200 | 50 | 16 | 20 | 0.80 | 0.8 | 0.31 |
| Example 23 | 190 | 50 | 16 | 20 | 0.80 | 0.6 | 0.32 |
| Example 24 | 200 | 50 | 12 | 16 | 0.75 | 0.6 | 0.33 |
| Example 25 | 190 | 50 | 12 | 16 | 0.75 | 0.8 | 0.32 |
| Example 26 | 220 | 50 | 16 | 20 | 0.80 | 0.6 | 0.32 |
| Example 27 | 190 | 50 | 20 | 24 | 0.83 | 0.8 | 0.34 |
| Example 28 | 200 | 50 | 16 | 20 | 0.80 | 0.8 | 0.31 |
| Example 29 | 200 | 50 | 16 | 20 | 0.80 | 0.8 | 0.33 |
| Example 30 | 200 | 50 | 16 | 20 | 0.80 | 0.8 | 0.32 |
| Example 31 | 200 | 50 | 12 | 16 | 0.75 | 0.6 | 0.32 |
| Example 32 | 200 | 50 | 14 | 16 | 0.88 | 0.8 | 0.31 |
| Example 33 | 200 | 50 | 16 | 20 | 0.80 | 0.8 | 0.33 |
| Example 34 | 200 | 50 | 14 | 16 | 0.88 | 0.8 | 0.34 |
| Example 35 | 200 | 50 | 14 | 16 | 0.88 | 0.8 | 0.34 |

TABLE 3

| Example/ Comparative Example | Composition | | | | | Composition Ratio | | | | Process Temperature Kneading Temperature (°C.) |
|---|---|---|---|---|---|---|---|---|---|---|
| | (A) | (B) | (C) | (D) | (E) | (B)/(A) | (C)/(A) | (D)/(A) | (E)/(A) | |
| Comparative Example 1 | CD1 = 100 | | | | | | | | | 240 |
| Comparative Example 2 | CD1 = 100 | PE1 = 10 | | | | 0.1 | | | | 230 |
| Comparative Example 3 | CD1 = 100 | | CE1 = 10 | | | | 0.1 | | | 220 |
| Comparative Example 4 | CD1 = 100 | | | AE1 = 10 | | | | 0.1 | | 240 |
| Comparative Example 5 | CD1 = 100 | PE1 = 10 | | AE1 = 10 | | 0.1 | | 0.1 | | 230 |
| Comparative Example 6 | CD1 = 100 | | CE1 = 10 | AE1 = 10 | | | 0.1 | 0.1 | | 220 |
| Comparative Example 7 | CD1 = 100 | PE1 = 3 | CE1 = 10 | | | 0.03 | 0.1 | | | 200 |
| Comparative Example 8 | CD1 = 100 | PE1 = 55 | CE1 = 10 | | | 0.55 | 0.1 | | | 190 |
| Comparative Example 9 | CD1 = 100 | PE1 = 3 | CE1 = 10 | AE1 = 10 | | 0.03 | 0.1 | 0.1 | | 200 |
| Comparative Example 10 | CD1 = 100 | PE1 = 55 | CE1 = 10 | AE1 = 10 | | 0.55 | 0.1 | 0.1 | | 190 |
| Comparative Example 11 | CD1 = 100 | PE1 = 10 | CE1 = 1 | | | 0.1 | 0.01 | | | 220 |
| Comparative Example 12 | CD1 = 100 | PE1 = 10 | CE1 = 18 | | | 0.1 | 0.18 | | | 190 |
| Comparative Example 13 | CD1 = 100 | PE1 = 10 | CE1 = 1 | AE1 = 10 | | 0.1 | 0.01 | 0.1 | | 220 |
| Comparative Example 14 | CD1 = 100 | PE1 = 10 | CE1 = 18 | AE1 = 10 | | 0.1 | 0.18 | 0.1 | | 190 |

TABLE 3-continued

| Example/Comparative Example | | | | | | | |
|---|---|---|---|---|---|---|---|
| Comparative Example 15 | CD1 = 100 | PE1 = 10 | CE8 = 10 | AE1 = 10 | 0.1 | 0.1 | 0.1 | 200 |
| Comparative Example 16 | CD1 = 100 | PE1 = 10 | CE9 = 10 | AE1 = 10 | 0.1 | 0.1 | 0.1 | 230 |

| | Process Temperature | | Evaluation | | | | |
|---|---|---|---|---|---|---|---|
| Example/Comparative Example | Molding Temperature (° C.) | Mold Temperature (° C.) | Weld-line Impact Strength (WL) (kJ/m$^2$) | Charpy Impact Strength (Non-WL) (kJ/m$^2$) | (WL)/(Non-WL) | Plane Impact Strength | Percentage (%) of Water-Absorption Dimensional Change |
| Comparative Example 1 | 240 | 50 | 2 | 7 | 0.29 | 0.2 | 0.66 |
| Comparative Example 2 | 230 | 50 | 1 | 4 | 0.25 | 0.2 | 0.64 |
| Comparative Example 3 | 220 | 50 | 6 | 10 | 0.60 | 0.2 | 0.65 |
| Comparative Example 4 | 240 | 50 | 4 | 8 | 0.50 | 0.2 | 0.66 |
| Comparative Example 5 | 230 | 50 | 2 | 6 | 0.33 | 0.2 | 0.65 |
| Comparative Example 6 | 220 | 50 | 6 | 10 | 0.60 | 0.2 | 0.62 |
| Comparative Example 7 | 200 | 50 | 4 | 8 | 0.50 | 0.2 | 0.64 |
| Comparative Example 8 | 190 | 50 | 3 | 6 | 0.50 | 0.2 | 0.55 |
| Comparative Example 9 | 200 | 50 | 6 | 10 | 0.69 | 0.2 | 0.65 |
| Comparative Example 10 | 190 | 50 | 4 | 8 | 0.50 | 0.2 | 0.56 |
| Comparative Example 11 | 220 | 50 | 2 | 6 | 0.33 | 0.2 | 0.62 |
| Comparative Example 12 | 190 | 50 | 6 | 10 | 0.60 | 0.4 | 0.65 |
| Comparative Example 13 | 220 | 50 | 2 | 6 | 0.33 | 0.2 | 0.64 |
| Comparative Example 14 | 190 | 50 | 6 | 10 | 0.60 | 0.4 | 0.52 |
| Comparative Example 15 | 200 | 50 | 3 | 8 | 0.38 | 0.4 | 0.55 |
| Comparative Example 16 | 230 | 50 | 2 | 7 | 0.29 | 0.4 | 0.52 |

The above-described results indicate that the resin molded bodies of Examples have higher weld-line impact strength than the molded bodies of Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
   a cellulose acylate (A) having, in a side chain, a group having a hydrocarbon chain with 5 to 24 carbon atoms;
   a polyester resin (B); and
   an ester compound (C) having a molecular weight of about 250 or more and about 2000 or less,
   wherein a mass ratio ((B)/(A)) of the polyester resin (B) to the cellulose acylate (A) is about 0.05 or more and about 0.5 or less, and a mass ratio ((C)/(A)) of the ester compound (C) to the cellulose acylate (A) is about 0.02 or more and about 0.15 or less,
   wherein the polyester resin (B) is a polyhydroxyalkanoate, the polyhydroxyalkanoate has a structural unit represented by general formula (PHA),

(PHA)

wherein $R^{PHA1}$ is a branched alkylene group,
   wherein an amount of the group having a hydrocarbon chain with 5 to 24 carbon atoms is from 0.15 groups to 2.5 groups on a number basis per glucose unit, and
   wherein the group having the hydrocarbon chain with 5 to 24 carbon atoms is selected from the group consisting of a cardanol-derived group, an acyl group having 5 to 24 carbon atoms, and an unsubstituted alkyl group having 5 to 24 carbon atoms, wherein
   the hydrocarbon chain with 5 to 24 carbon atoms of the cardanol-derived group is an unsubstituted alkyl group, and the hydrocarbon chain with 5 to 24 carbon atoms of the acyl group is a combination of a carbonyl group and an unsubstituted alkyl group.

2. The resin composition according to claim 1, further comprising at least one polymer (D) selected from:
a core-shell structure polymer having: a core layer, and a shell layer formed on a surface of the core layer and containing an alkyl (meth)acrylate polymer, and
an olefin polymer containing about 60 mass% or more of a structural unit derived from α-olefin.

3. The resin composition according to claim 1, further comprising a poly(meth)acrylate compound (E) including about 50 mass% or more of a structural unit derived from an alkyl (meth)acrylate.

4. The resin composition according to claim 1, wherein the polyester resin (B) is polylactic acid.

5. The resin composition according to claim 1, wherein the ester compound (C) is a fatty acid ester compound.

6. The resin composition according to claim 5, wherein the ester compound (C) is an adipic acid ester-containing compound.

7. A resin molded body comprising the resin composition according to claim 1.

8. The resin molded body according to claim 7, wherein the resin molded body is an injection-molded body.

9. A resin composition comprising:
a cellulose acylate (A) having, in a side chain, a group having a hydrocarbon chain with 5 to 24 carbon atoms;
a polyester resin (B); and
an ester compound (C) having a molecular weight of about 250 or more and about 2000 or less, wherein a weld-line impact strength is about 10 kJ/m² or more, and a value obtained by dividing the weld-line impact strength by a Charpy impact strength is about 0.5 or more, wherein the polyester resin (B) is a polyhydroxyalkanoate, the polyhydroxyalkanoate has a structural unit represented by general formula (PHA),

(PHA)

wherein $R^{PHA1}$ is a branched alkylene group,
wherein an amount of the group having a hydrocarbon chain with 5 to 24 carbon atoms is from 0.15 groups to 2.5 groups on a number basis per glucose unit, and
wherein the group having the hydrocarbon chain with 5 to 24 carbon atoms is selected from the group consisting of a cardanol-derived group, an acyl group having 5 to 24 carbon atoms, and an unsubstituted alkyl group having 5 to 24 carbon atoms, wherein
the hydrocarbon chain with 5 to 24 carbon atoms of the cardanol-derived group is an unsubstituted alkyl group, and
the hydrocarbon chain with 5 to 24 carbon atoms of the acyl group is a combination of a carbonyl group and an unsubstituted alkyl group.

* * * * *